United States Patent [19]

Uematsu

[11] Patent Number: 5,123,758
[45] Date of Patent: Jun. 23, 1992

[54] LABEL PRINTER AND METHOD USING A MEMORY FRAME BUFFER SMALLER IN SIZE THAN THE LABEL SIZE

[75] Inventor: Kaoru Uematsu, Shizuoka, Japan

[73] Assignee: Tokyo Electric Co., Ltd., Tokyo, Japan

[21] Appl. No.: 695,315

[22] Filed: May 3, 1991

[30] Foreign Application Priority Data

May 18, 1990 [JP] Japan ................................ 2-130047

[51] Int. Cl.⁵ .............................................. B41J 5/30
[52] U.S. Cl. ..................................... 400/63; 400/104; 400/120; 400/76; 395/117
[58] Field of Search .............. 400/63, 76, 120-121, 400/104, 68; 395/116, 117; 364/710.09, 710.13

[56] References Cited

U.S. PATENT DOCUMENTS

| 4,755,955 | 7/1988 | Kimura et al. ............ 400/63 |
| 4,826,333 | 5/1989 | Tanaka ..................... 400/76 |
| 4,862,194 | 8/1989 | Uematsu . |
| 4,944,614 | 7/1990 | Tanaka ..................... 400/68 |
| 4,979,131 | 12/1990 | Suzuki ..................... 395/116 |
| 4,984,182 | 1/1991 | Chang et al. ............. 395/116 |
| 5,021,975 | 6/1991 | Yamanaski ............... 395/117 |
| 5,025,397 | 6/1991 | Suzuki ..................... 395/117 |

Primary Examiner—Eugene H. Eickholt
Attorney, Agent, or Firm—Frishauf, Holtz, Goodman & Woodward

[57] ABSTRACT

When the label size is larger than the memory size of a frame buffer on which information to be printed on a label is drawn, the label is divided into a plurality of areas. A drawing enable area in the frame buffer is designated for drawing fields included in each divided area in units of divided areas, thereby performing label printing.

14 Claims, 9 Drawing Sheets

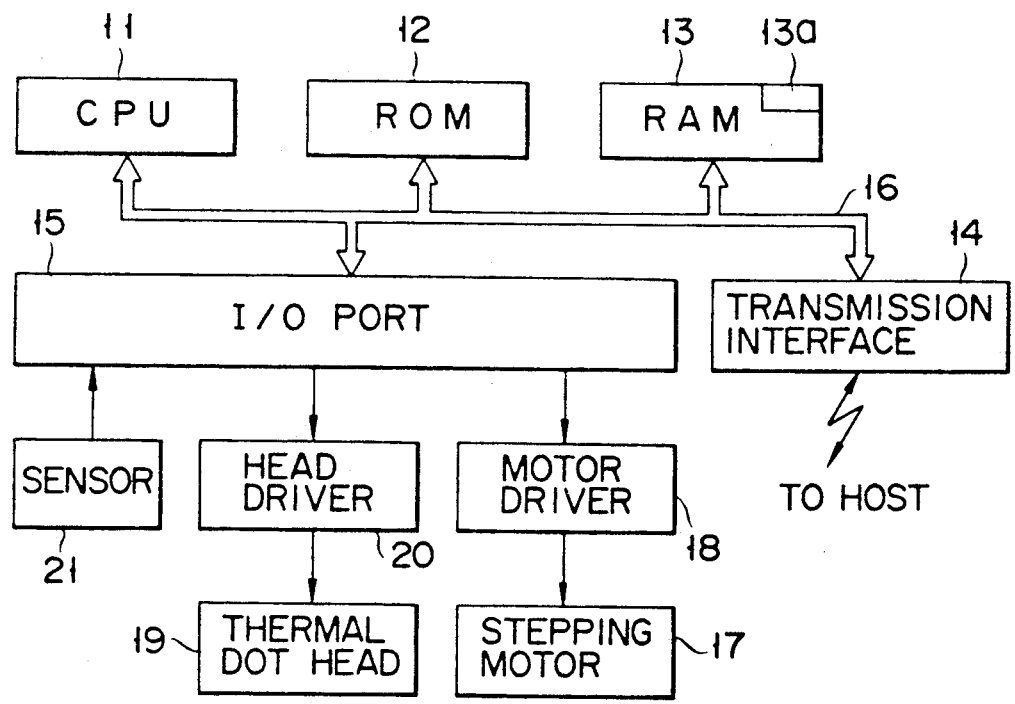
F I G. 1

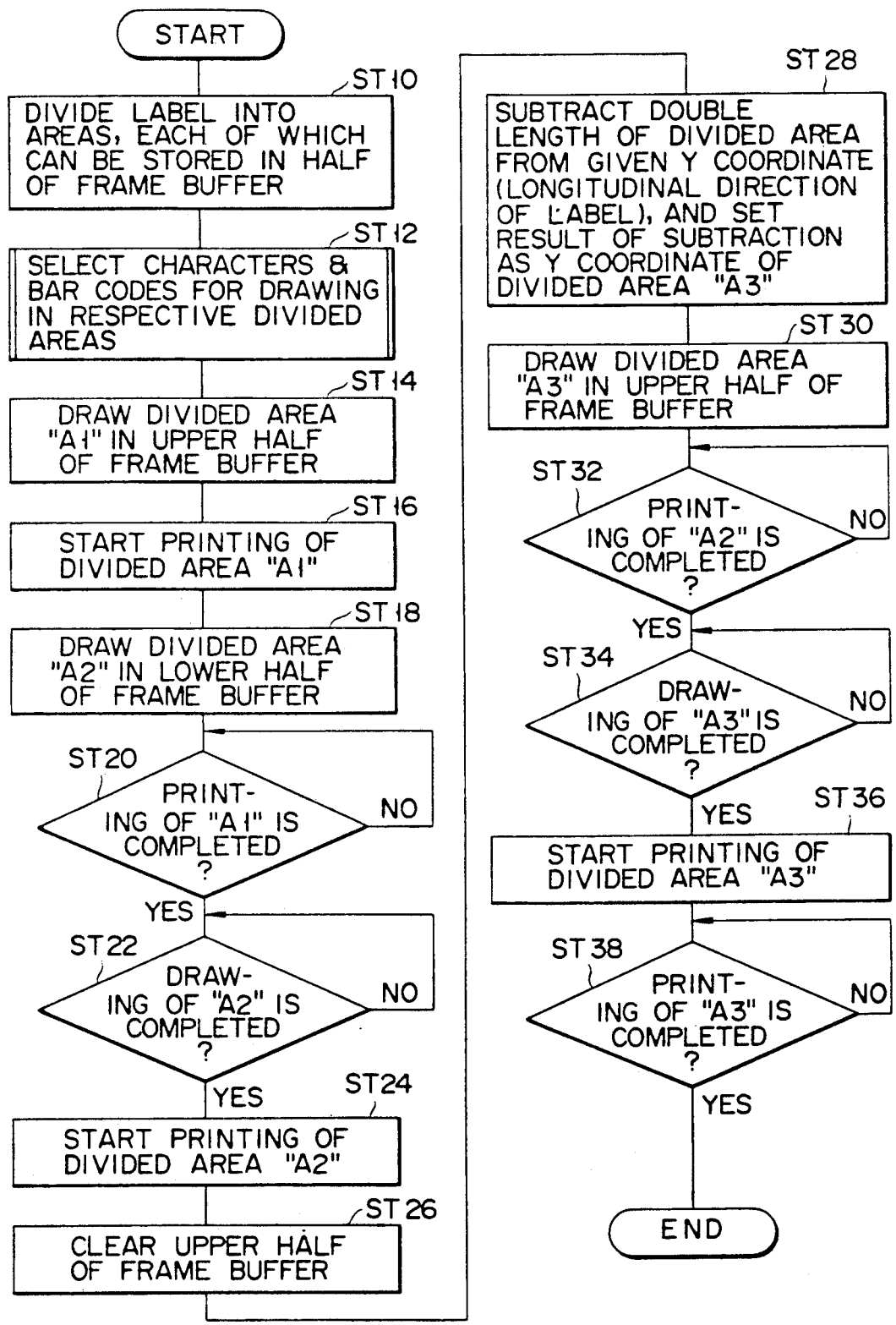
F I G. 4

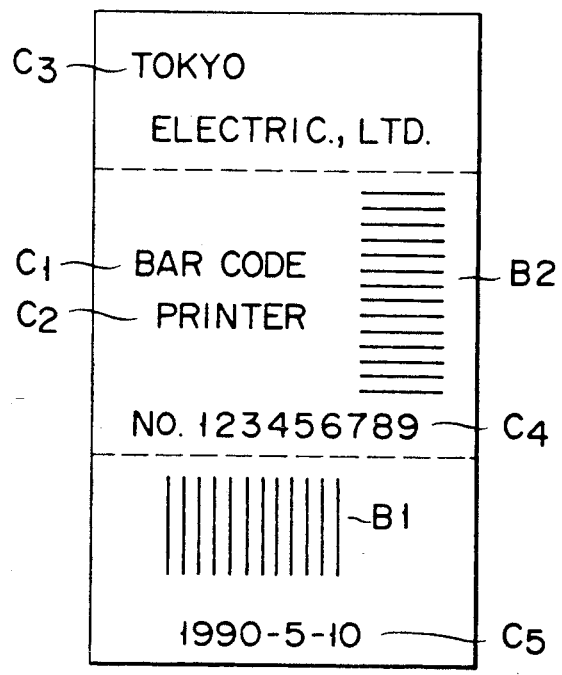
F I G. 6
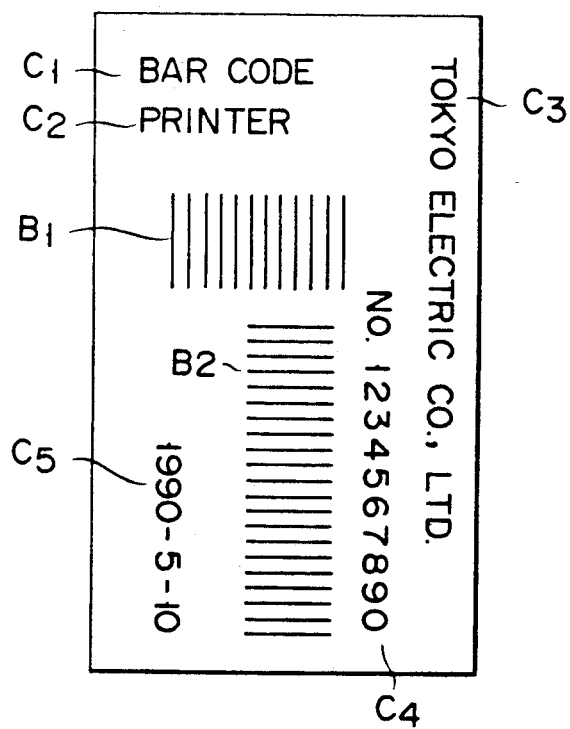
F I G. 7

LABEL PRINTER AND METHOD USING A MEMORY FRAME BUFFER SMALLER IN SIZE THAN THE LABEL SIZE

BACKGROUND OF THE INVENTION

1. Field of the Invention

The present invention relates to a label printer for printing characters, bar codes, and the like on labels (tags) such as clothing tags, distribution labels, and the like. More particularly, the present invention relates to a manner of printing used when the label size is larger than the memory size of a frame buffer on which information to be printed on a label is drawn.

2. Description of the Related Art

When the label size is larger than the memory size of a frame buffer on which information to be printed on a label (bit map image) is drawn, the information is printed on the label as follows. More specifically, when a plurality of drawing fields (e.g., bar code drawing fields B1 and B2, and character drawing fields C1, C2, C3, C4, and C5 shown in FIG. 6) are printed on a label, the label is divided into a plurality of areas at portions including no drawing fields, as indicated by dotted lines in FIG. 6, and the drawing fields in the respective divided areas are sequentially drawn on the frame buffer, thereby printing information on one label.

According to the method of dividing a label into a plurality of areas at portions including no drawing fields, however, when drawing fields B1, B2, C1, C2, C3, C4, and C5 are printed on a label in a layout shown in FIG. 7, for example, it is difficult to divide the label at portions including no drawing fields.

SUMMARY OF THE INVENTION

It is, therefore, an object of the present invention to provide a label printer and a label printing method, capable of printing drawing fields on a label regardless of the layout of the fields when the label size is larger than the memory size of a frame buffer.

According to the present invention, when the label size is larger than the memory size of a frame buffer.

According to the present invention, when the label size is larger than the memory size of a frame buffer on which information to be printed on a label is drawn, the label is divided into a plurality of areas. A drawing enable area in the frame buffer is designated for the drawing fields included in each divided area in units of divided areas, thereby performing label printing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 5 and FIGS. 8 to 12 show an embodiment of the present invention, in which:

FIG. 1 is a block diagram of a label printer;

FIG. 2 is a view showing a frame buffer;

FIG. 3 shows a label size, and a layout of drawing fields;

FIG. 4 is a flow chart showing label printing control by a CPU;

FIG. 6 shows a conventional label;

FIG. 7 shows a label layout which cannot be printed by a conventional method;

FIG. 10 is a flow chart showing a sequence for selecting characters and bar codes to be drawn in units of divided areas (A1, A2, and A3 in FIG. 3);

FIG. 11 is a flow chart showing a sequence for obtaining coordinates of four corners of character strings (FIGS. 8A and 8B) selected in FIG. 10; and FIG. 12 is a flow chart showing a sequence for obtaining coordinates of four corners of bar codes (FIGS. 9A and 9B) selected in FIG. 10.

DETAILED DESCRIPTION OF THE PREFERRED EMBODIMENTS

An embodiment of the present invention will be described below with reference to the accompanying drawings.

Figure 2:
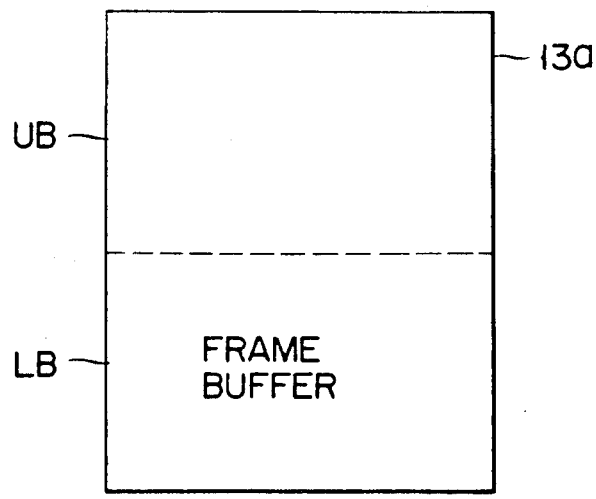

FIG. 1 is a block diagram of a label printer. Reference numeral 11 denotes a CPU (central processing unit) constituting a control unit main body; 12, a ROM (read-only memory) for storing program data used by CPU 11 to control respective units; 13, a RAM (random-access memory), including frame buffer 13a (FIG. 2), for externally received printing data, and the like; 14, a transmission interface for performing communication control with an externally connected host device (not shown); and 15, an I/O port.

CPU 11 is connected to ROM 12, RAM 13, transmission interface 14, and I/O port 15 via bus line 16.

I/O port 15 is connected to motor driver 18 for driving stepping motor 17 for performing convey control of labels, head driver 20 for driving thermal dot head 19 for printing information on labels, and sensor 21 for detecting label positions. Note that the present invention may be applied to other label printers disclosed in, e.g., U.S. Pat. No. 4,862,194 (Umematsu). All the disclosures of this U.S. Patent are incorporated in the specification of the present invention.

The origin (0, 0) of label 22 in FIG. 3 can be determined as follows.

Assume that sensor 21 is positioned on the center line of label 22 which has width Lx with respect to the feeding direction to thermal head 19. When leading edge 22x of label 22 reaches the position of sensor 21, sensor 21 outputs a signal which is used to detect the y-axis origin (0) on the center line of label 22. In this case, since the value of width Lx of label 22 is known, the x-axis origin (0) can be detected by shifting from the detected center line position (y=0) toward the left side on the x-axis, by Lx/2. Thus, CPU 11 can calculate from the signal output timing of sensor 21 the origin (0, 0) located at the upper left corner of label 22.

Incidentally, if left side edge 22y of label 22 is always set at a predetermined fixed position irrespective of various values of label width Lx, CPU 11 can detect the origin (0, 0) directly from the signal output timing of sensor 21 which is located on the line of left side edge 22y of label 22.

CPU 11 performs printing control shown in FIG. 4 on the basis of program data stored in ROM 12.

Now, a case will be examined below wherein bar code drawing fields B1 and B2, and character drawing fields C1, C2, C3, C4, and C5 are printed in a layout shown in FIG. 3 on label 22 (FIG. 3) which has a size larger than the size (e.g., 64 Kbyte) of frame buffer 13a. In this case, CPU 11 divides label 22 into areas each having a size (32 Kbyte) half that of frame buffer 13a (ST10). More specifically, division lines are set, as indicated by dotted lines L1 and L2 in FIG. 3, thereby dividing label 22 into three divided areas A1, A2, and A3. In this case, coordinate data of division lines L1 and L2 on the label are stored in RAM 13.

Characters and bar codes to be drawn are selected in units of divided areas A1, A2, and A3 (ST12). More specifically, drawing fields C1, C2, C3, and B1 included in divided area A1 either entirely or partially are selected, drawing fields C3, C4, C5, B1, and B2 included in divided area A2 either entirely or partially are selected, and drawing fields C3, C4, C5, and B2 included in divided area A3 either entirely or partially are selected (a selection method will be described later with reference to FIG. 10).

Figure 5A:
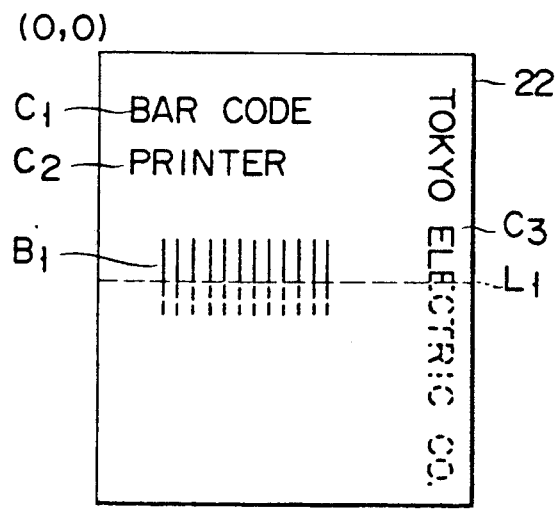
FIGS. 5A to 5C show drawing procedures of contents of divided areas onto the frame buffer.

In this state, upper half UB (first half of all the addresses) of frame buffer 13b is designated as a drawing enable area, and the content of divided area A1, i.e., drawing fields C1, C2, C3, and B1 are drawn (ST14), as shown in FIG. 5A. Upon completion of this drawing, dot head 19 and stepping motor 17 are driven to start printing of the drawn content, i.e., divided area A1 (ST16).

Figure 5B:
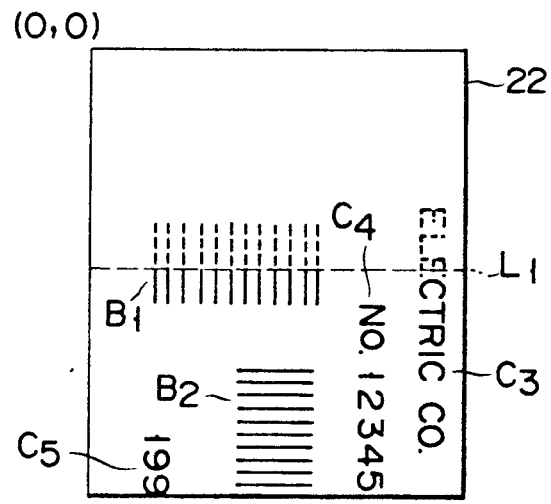

Subsequently, lower half (LB) (second half of the addresses) of frame buffer 13a is designated as a drawing enable area, and the content of divided area A2, i.e., drawing fields C3, C4, C5, B1, and B2 are drawn (ST18), as shown in FIG. 5B.

In this state, the control waits for completion of printing of divided area A1 (ST20). Upon completion of printing of divided area A1 (YES in ST20), the control waits for completion of drawing of divided area A2 to frame buffer 13a (ST22).

Upon completion of drawing of divided area A2 (YES in ST22), printing of divided area A2 is started (ST24). In this case, when drawing of divided area A2 has already been completed upon completion of printing of divided area A1, printing of divided area A2 is immediately started. More specifically, if one (A2) of a plurality of areas (A1 to A3) has already been drawn, printing of the drawn area (A2) can be performed while drawing another area (A3). In this manner, when drawing to buffer 13a and printing on label 22 are executed parallelly, a time required for completing label printing can be shortened. The upper half (UB) of frame buffer 13a is cleared (ST26).

Subsequently, the double length of length W of the divided area is subtracted from a designated Y coordinate (longitudinal direction of label 22), and the result of subtraction is set as the Y coordinate (position of line L3) of divided area A3 (ST28).

Figure 5C:
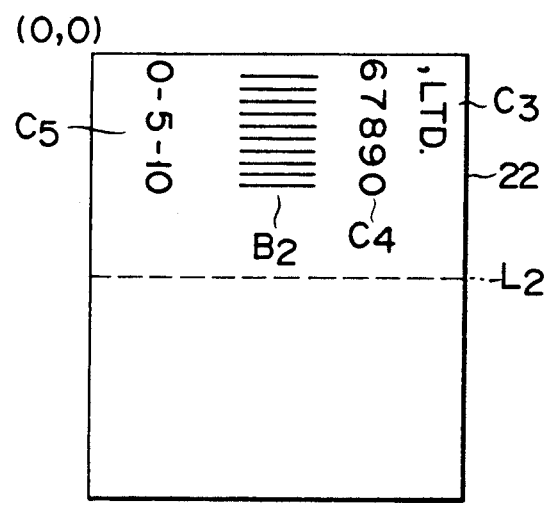

The upper half of frame buffer 13a is designated as the drawing enable area, and the content of divided area A3, i.e., drawing fields C3, C4, C5, and B2 are drawn, as shown in FIG. 5C (ST30).

In this state, the control waits for completion of printing of divided area A2 (ST32) When printing of divided area A2 is completed (YES in ST32), the control waits for completion of drawing of divided area A3 on frame buffer 13a (ST34).

When drawing of divided area A3 is completed (YES in ST34), printing of divided area A3 is started (ST36). In this case, when drawing of divided area A3 has already been completed upon completion of printing of divided area A2, printing of divided area A3 is immediately started. In this state, the control waits for completion of printing of divided area A3 (ST38).

If the coordinates on the upper left corner of label 22 in FIG. 5C are represented by (0, 0), drawing fields in FIG. 5B are present at minus coordinates. However, these minus coordinates are theoretical ones, and are managed by an operating system software program of CPU 11. In other words, no frame buffer area for minus coordinates is physically present.

In this embodiment with the above arrangement, when information is printed on a label having a size (e.g., 100 Kbyte) larger than the size (e.g., 64 Kbyte) of frame buffer 13a, even if a plurality of fields C1 to C5, and B1 and B2 are laid out on a label (i.e., even if there are no portions including no drawing fields when the label is divided), the label need only be divided into areas each having half the size of the frame buffer 13a.

Figure 3:
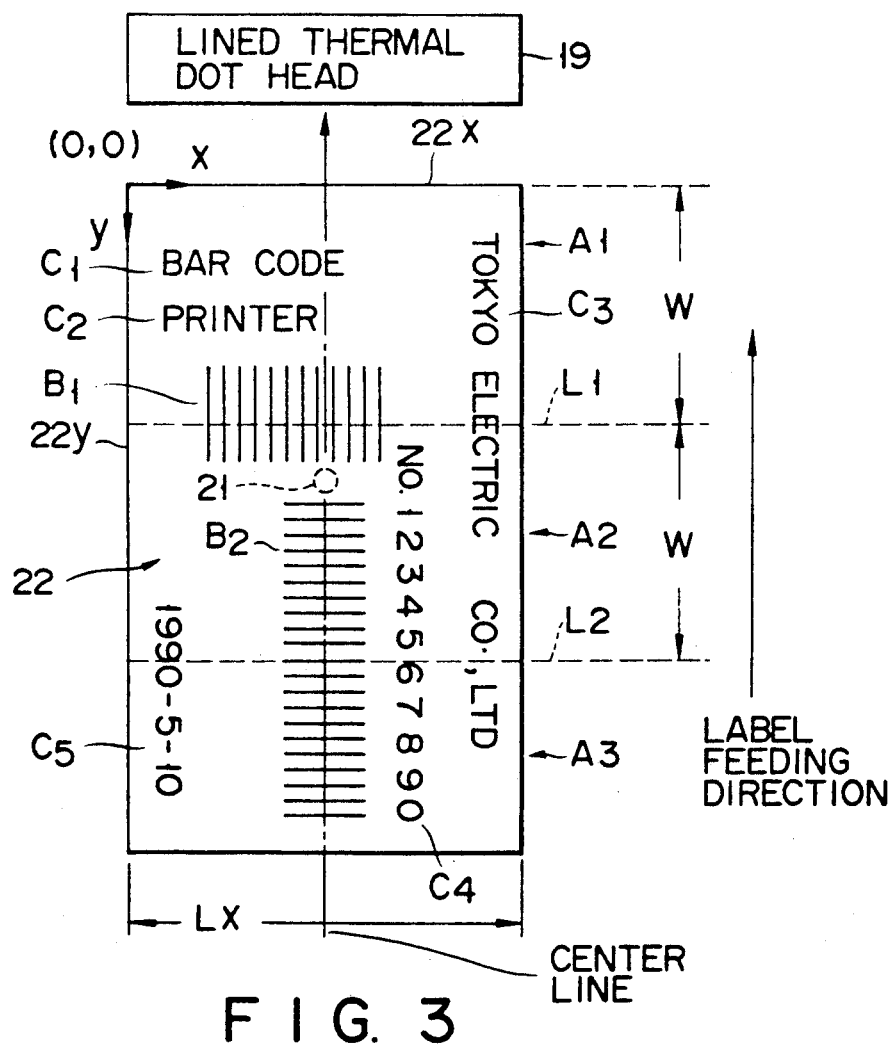

For example, label 22 shown in FIG. 3 can be divided into three divided areas A1, A2, and A3 by division lines crossing drawing fields, as indicated by dotted lines L1 and L2 in FIG. 3.

As a result of this dividing operation, character drawing field C3 extends over divided areas A1, A2, and A3, bar code drawing field B1 extends over divided areas A1 and A2, and character drawing fields C4 and C5, and bar code drawing field B2 extend over divided areas A2 and A3.

Drawing fields C1, C2, C3, and B1 included in divided area A1 either entirely or partially are selected, drawing fields C3, C4, C5, B1, and B2 included in divided area A2 either entirely or partially are selected, and drawing fields C3, C4, C5, B1, and B2 included in divided area A3 either entirely or partially are selected.

The upper and lower halves of frame buffer 13a are alternately designated as a drawing enable area, and the contents of divided areas A1, A2, and A3 are sequentially drawn on the frame buffer, and are sequentially printed.

More specifically, the upper half of frame buffer 13a is designated as the drawing enable area, and the content of divided area A1 is drawn. Upon completion of this drawing, the drawn content is printed. The lower half of frame buffer 13a is designated as the drawing enable area, and the content of divided area A2 is drawn. Upon completion of printing of divided area A1, and upon completion of drawing of divided area A2, printing of divided area A2 is subsequently started. In addition, the upper half of frame buffer 13a is cleared. Furthermore, the upper half of frame buffer 13a is designated as the drawing enable area, and the content of divided area A3 is drawn. Upon completion of printing of divided area A2, and upon completion of drawing of divided area A3, printing of divided area A3 is then started. When printing of divided area A3 is completed, printing of one label is ended.

Figure 8A:
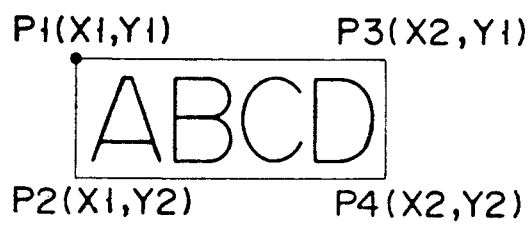
FIGS. 8A and 8B show character strings to be printed.
Figure 8B:
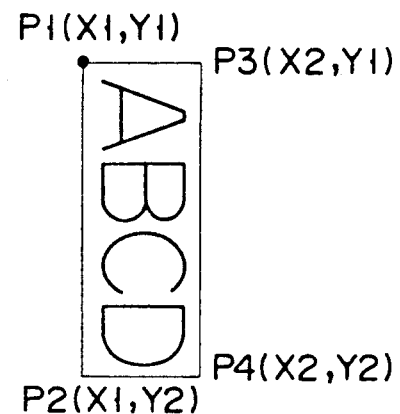

FIGS. 8A and 8B show character strings to be printed. FIG. 8A shows a case wherein a character string "ABCD" is aligned in the horizontal direction (X-axis direction) of label 22, and FIG. 8B shows a case wherein a character string "ABCD" is aligned in the vertical direction (Y-axis direction) of label 22

Figure 9A:
FIGS. 9A and 9B show bar codes to be printed.
Figure 9B:
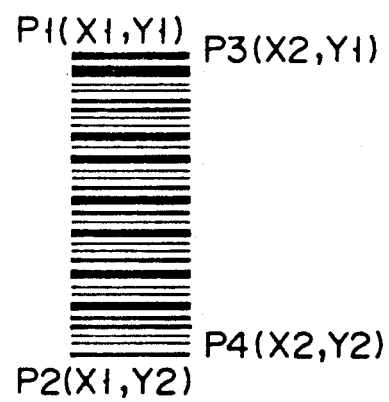

FIGS. 9A and 9B show bar codes to be printed. FIG. 9A shows a case wherein bar codes are aligned in the horizontal direction (X-axis direction) of label 22, and FIG. 9B shows a case wherein bar codes are aligned in the vertical direction (Y-axis direction) of label 22.

Figure 10:
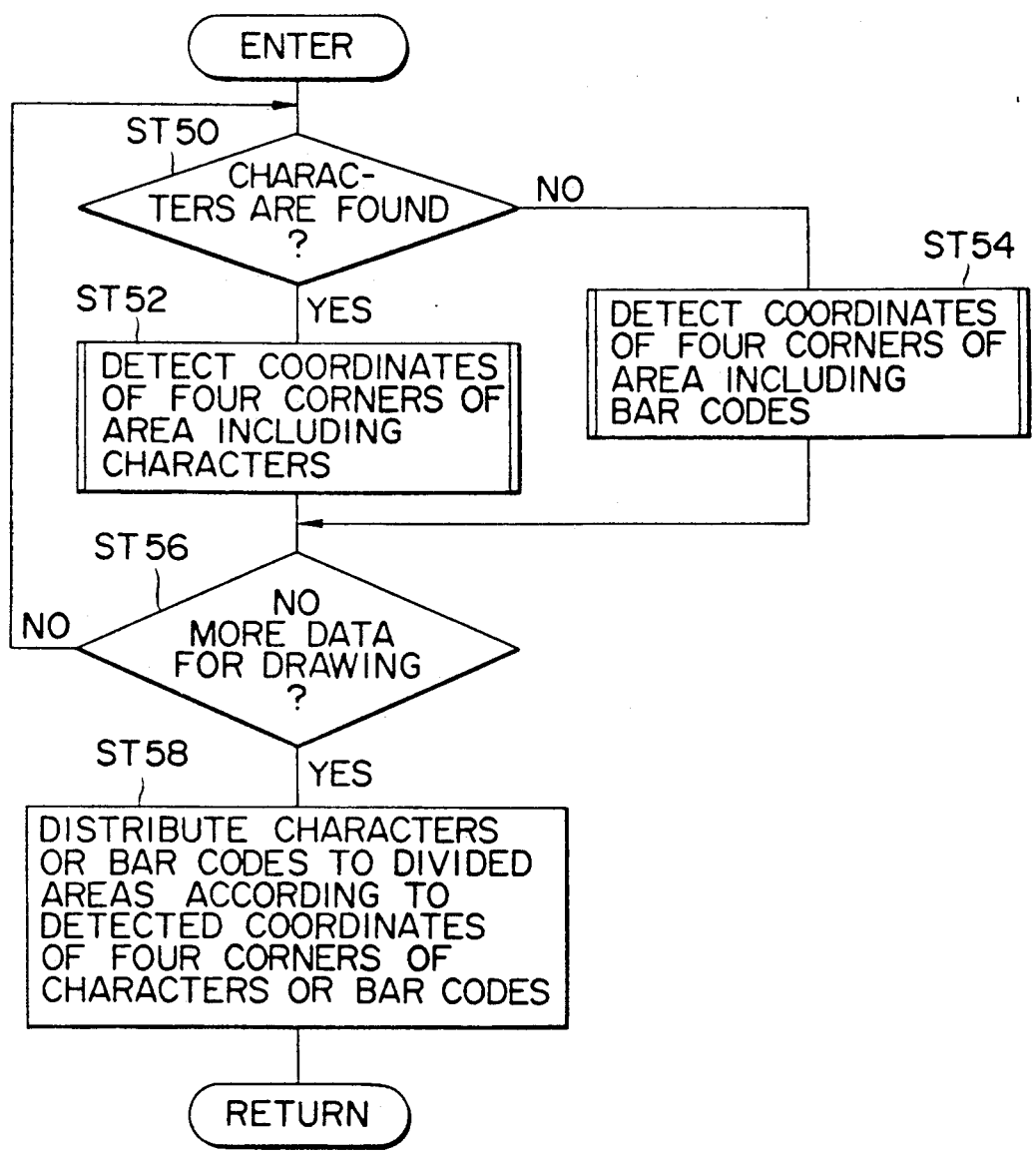

FIG. 10 is a flow chart showing in detail selection processing in step ST12 in FIG. 4. First, whether label printing data fetched from the host device (not shown) to the printer shown in FIG. 1 are characters or bar codes is discriminated (ST50).

If the fetched data are characters (YES in ST50), the coordinates of four corners (P1 to P4 in FIG. 8A or 8B) of a rectangular region surrounding the fetched characters are detected (ST52). If the fetched data are bar codes (NO in ST50), the coordinates of four corners (P1 to P4 in FIG. 9A or 9B) of a rectangular region surrounding the fetched bar codes are detected (ST54). If fetching of printing data (characters or bar codes) to be drawn on a label is completed (YES in ST56), the fetched characters and bar codes are distributed to divided areas A1 to A3 in FIG. 3 on the basis of the detected coordinates of the four corners (ST58).

Figure 11:
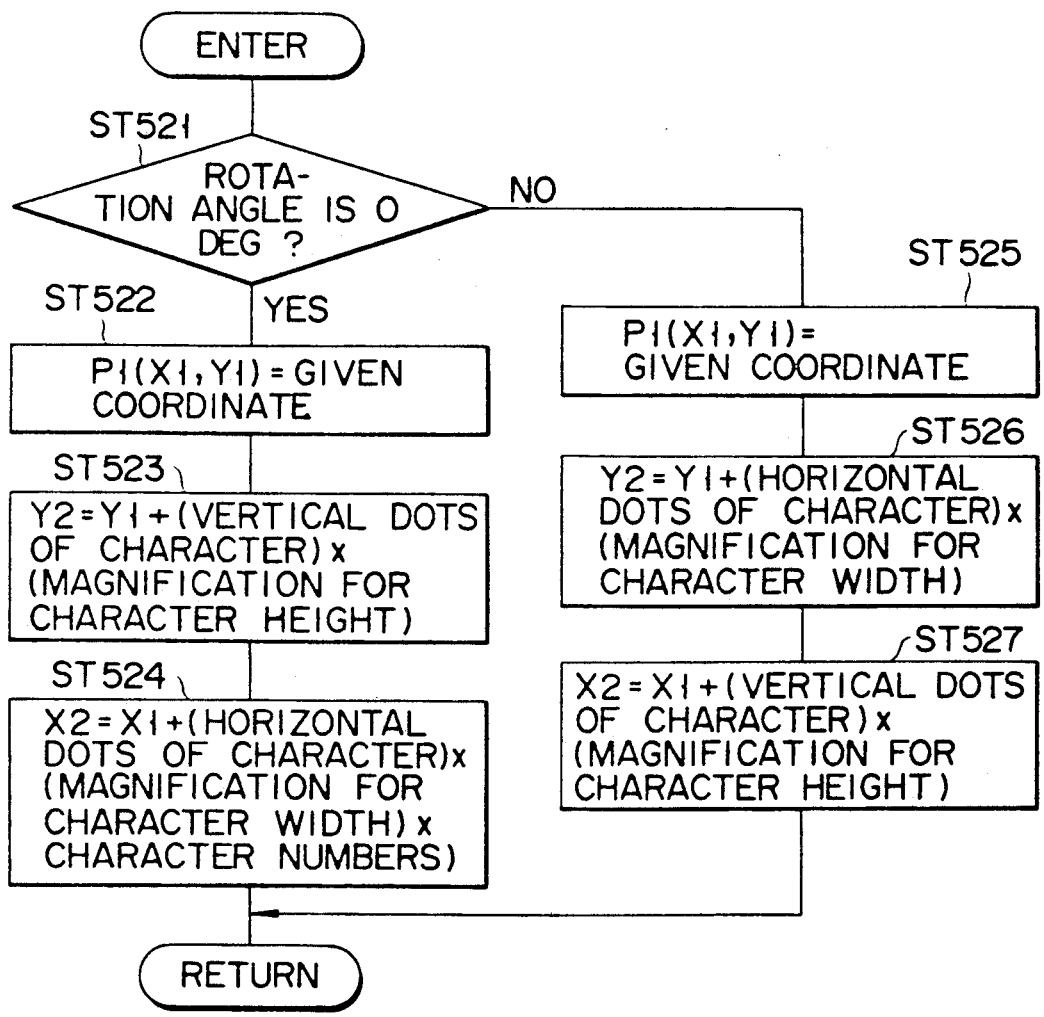

FIG. 11 is a flow chart showing in detail coordinate determination processing in step ST52 in FIG. 10. If the fetched characters are aligned to be parallel to the widthwise direction of label 22, as shown in FIG. 8A (no rotation; YES in ST521), coordinates P1 (X1, Y1) of the upper left corner of the region surrounding the characters are defined as given coordinates assigned to the characters (ST522). After coordinates P1 (X1, Y1) are determined, coordinate Y2 indicating the height of the characters is calculated on the basis of the sum of Y1 and (vertical dots of character)×(magnification for character height) (ST523), and coordinate X2 indicating the total width of the characters is calculated on the basis of the sum of X1 and (horizontal dots of character)×(magnification for character width)×(character number) (ST524).

When the fetched characters are aligned in the longitudinal direction of label 22, as shown in FIG. 8B (90° rotation; NO in ST521), coordinate P1 (X1, Y1) of the upper left corner of the region surrounding the characters are defined as given coordinates assigned to the characters (ST525). After coordinates P1 (X1, Y1) are determined, coordinate Y2 indicating the total width of the characters is calculated on the basis of the sum of Y1 and (horizontal dots of character)×(magnification for character width)×(character number) (ST526), and coordinate X2 indicating the height of the characters is calculated on the basis of the sum of X1 and (vertical dots of character)×(magnification for character height) (ST527).

Figure 12:
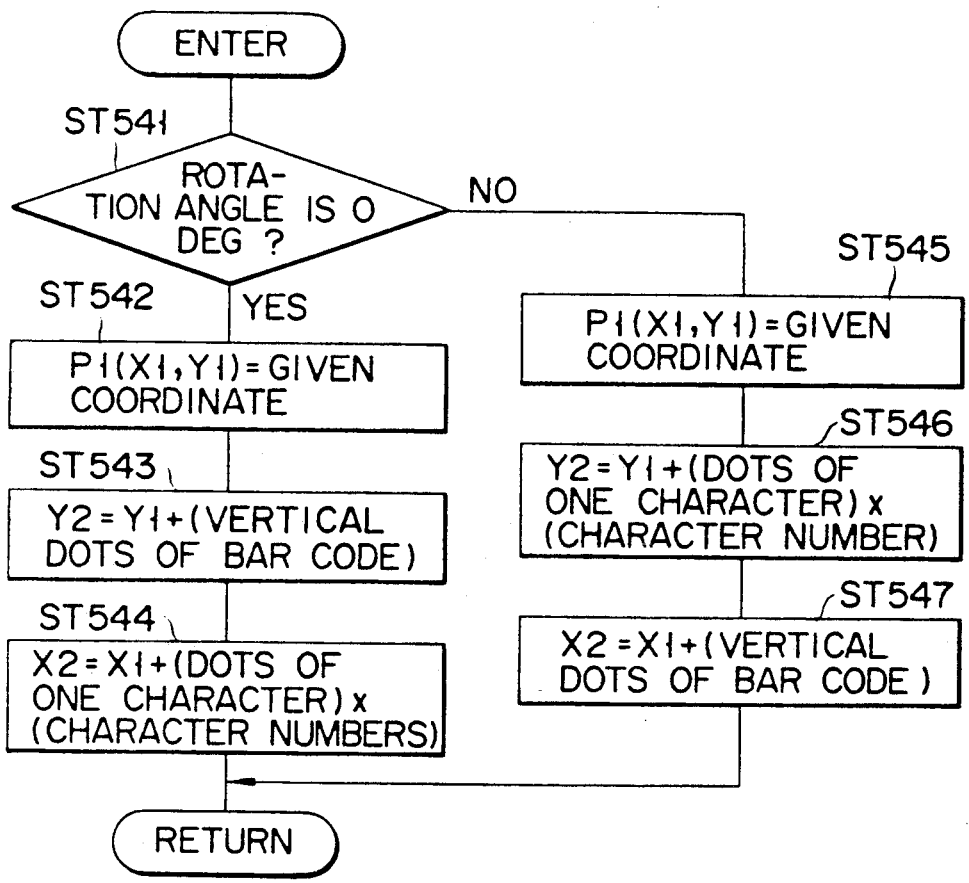

FIG. 12 is a flow chart showing in detail coordinate determination processing in step ST54 in FIG. 10. If the fetched bar codes are aligned to be parallel to the widthwise direction of label 22, as shown in FIG. 8A (no rotation; YES in ST541), coordinates P1 (X1, Y1) of the upper left corner of the region surrounding the bar codes are defined as given coordinates assigned to the bar codes (ST542). After coordinates P1 (X1, Y1) are determined, coordinate Y2 indicating the height of the bar codes is calculated on the basis of the sum of Y1 and vertical dots (the height of the bar codes) (ST543), and coordinate X2 indicating the total width of the bar codes is calculated on the basis of the sum of X1 and (dots of one character)×(character number) (ST544).

When the fetched bar codes are aligned in the longitudinal direction of label 22, as shown in FIG. 8B (90° rotation; NO in ST541), coordinate P1 (X1, Y1) of the upper left corner of the region surrounding the bar codes are defined as given coordinates assigned to the bar codes (ST545). After coordinates P1 (X1, Y1) are determined coordinate Y2 indicating the total width of the bar codes is calculated on the basis of the sum of Y1 and (dots of one character)×(character number) (ST546), and coordinate X2 indicating the height of the bar codes is calculated on the basis of the sum of X1 and (vertical dots of bar code) (ST547).

In this manner, all the drawing fields included in each of divided areas A1 to A3 either entirely or partially are selected, the drawing enable area of frame buffer 13a is designated in this state, and the content of each divided area is drawn on frame buffer 13a and is then printed on a label. Therefore, even if the division lines (L1, L2) cross the drawing fields (B1, B2, C3, C4, C5), label printing can be performed without posing a problem. In other words, drawing fields can be printed on a label regardless of their layout. Therefore, since label printing is not limited, practicability can be improved.

In the above embodiment, a label subjected to printing is divided into three areas. However, the present invention is not limited to this, as a matter of course.

In the above embodiment, the frame buffer is divided into upper and lower halves in use. However, the present invention is not limited to this. The frame buffer may be used without being divided. In this case, a label is divided into two areas.

In the above embodiment, the size of characters, character interval, the magnification and height of bar codes are left unchanged. However, even if these parameters are changed, the present invention is applicable.

As described above, according to the present invention, when the label size is larger than the memory size of a frame buffer, printing can be performed regardless of the layout of drawing fields on a label, thus improving practicability.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A label printing method comprising the steps of:
dividing a label into a plurality of areas when a label size is larger than a memory size of a frame buffer on which information to be printed is drawn;
sequentially designating drawing enable fields in said frame buffer; and
drawing, in units of the divided areas, the information to the designated drawing field included in each of the divided areas so as to print the information on one label.

2. A label printer comprising:
a frame buffer on which information to be printed on a label is drawn, and which has a predetermined storage size;
means for dividing said label into a plurality of areas; and
means for drawing a drawing field, included in any of said divided areas and including the information to be printed, on a drawing enable area of said frame buffer, so that the information to be printed drawn on said drawing enable area is printed on said label.

3. A printer according to claim 2, wherein said dividing means divides said label when a size of said label is larger than the storage size of said frame buffer and a size of said drawing enable area is not more than the storage size of said frame buffer.

4. A label printer comprising:
a frame buffer on which information to be printed on a label is drawn, and which has a predetermined storage size;
means for, when a size of said label is larger than the storage size of said frame buffer, dividing said label into a plurality of areas; and
means for drawing a drawing field, included in any of said divided areas and including the information to be printed, on a drawing enable area of said frame buffer, so that the information to be printed drawn on said drawing enable area is printed on said label, a size of said drawing enable area being not more than the storage size of said frame buffer.

5. A printer according to claim 4, further comprising:
means for drawing on the drawing enable area the drawing field contained in one of the divided areas of said label; and
means for drawing on the drawing enable area the drawing field contained in another one of the divided areas of said label.

6. A printer according to claim 4, wherein said frame buffer includes a first drawing enable area and a second drawing enable area each serving as the drawing enable area, and a size of each of said first and second drawing enable areas is substantially half the storage size of said frame buffer.

7. A printer according to claim 6, further comprising means for drawing information to be printed next on said second drawing enable area while printing on said label the information to be printed drawn on said first drawing enable area.

8. A printer according to claim 7, further comprising means for clearing a content of said first drawing enable area and then drawing the information to be printed next on said first drawing enable area while printing on said label the information to be printed drawn on said second drawing enable area.

9. A printer according to claim 4, further comprising detection means for detecting which divided area includes the drawing field.

10. A printer according to claim 9, wherein the drawing field has substantially a rectangular shape, and
said detection means includes means for obtaining coordinates of corners of the drawing field on said label, and detects which divided area includes the drawing field on the basis of the coordinates of the obtained corners.

11. A printer according to claim 10, wherein the information to be printed includes characters.

12. A printer according to claim 10, wherein the information to be printed includes bar codes.

13. A printer according to claim 10, wherein the information to be printed includes a variable character string.

14. A printer according to claim 10, wherein the information to be printed includes bar codes whose shape is variable.

* * * * *